United States Patent
Oren et al.

(10) Patent No.: US 10,284,501 B2
(45) Date of Patent: May 7, 2019

(54) TECHNOLOGIES FOR MULTI-CORE WIRELESS NETWORK DATA TRANSMISSION

(71) Applicant: Intel IP Corporation, Santa Clara, CA (US)

(72) Inventors: Elad Oren, Tel Aviv (IL); Marina Sharkansky, Haifa (IL); Oren Kaidar, Hillsboro, OR (US); Rafi Raskin, Haifa (IL); Moshe Island, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 26 days.

(21) Appl. No.: 15/372,962

(22) Filed: Dec. 8, 2016

(65) Prior Publication Data

US 2018/0167340 A1    Jun. 14, 2018

(51) Int. Cl.
*G06F 21/53* (2013.01)
*H04L 12/861* (2013.01)
*H04L 12/801* (2013.01)
*H04L 12/863* (2013.01)

(52) U.S. Cl.
CPC .......... *H04L 49/9047* (2013.01); *H04L 47/34* (2013.01); *H04L 47/62* (2013.01)

(58) Field of Classification Search
CPC ..... H04L 49/9047; H04L 47/34; H04L 47/62; H04W 72/044
See application file for complete search history.

(56) References Cited

U.S. PATENT DOCUMENTS

| 6,424,870 B1 * | 7/2002 | Maeda | H04L 1/1671 370/400 |
| 8,194,690 B1 * | 6/2012 | Steele | H04L 49/90 370/412 |
| 8,848,532 B2 * | 9/2014 | Zhi | G06F 15/17325 370/235 |
| 9,052,957 B2 * | 6/2015 | David | G06F 9/3851 |

(Continued)

OTHER PUBLICATIONS

International search report for PCT application No. PCT/US2017/060586, dated Feb. 6, 2018 (3 pages).

(Continued)

*Primary Examiner* — Xavier Szewai Wong
(74) *Attorney, Agent, or Firm* — Barnes & Thornburg LLP

(57) ABSTRACT

Technologies for multi-core wireless data transmission include a computing device having a processor with multiple cores and a wireless network interface controller (NIC). The computing device establishes multiple transmission queues that are each associated with a processor core. A driver receives a packet for transmission from an application in the execution context of the application, determines a current processor core of the execution context, adds metadata to the packet indicative of the current core, and enqueues the packet in the transmission queue associated with the current core. The wireless NIC merges the packet with packet data from the other transmission queues, adds a sequence number to each packet, and transmits each packet. The wireless NIC may determine the current processor core based on the metadata of the packet and raise an interrupt to the current processor core in response to transmitting the packet. Other embodiments are described and claimed.

25 Claims, 4 Drawing Sheets

(56) References Cited

U.S. PATENT DOCUMENTS

| | | | | |
|---|---|---|---|---|
| 9,276,854 | B2* | 3/2016 | Cornett | H04L 47/10 |
| 9,800,698 | B1* | 10/2017 | Reinbold | H04L 69/324 |
| 9,870,467 | B2* | 1/2018 | Pandey | G06F 21/53 |
| 2005/0249222 | A1* | 11/2005 | van Kampen | H04W 28/06 |
| | | | | 370/395.5 |
| 2006/0075119 | A1* | 4/2006 | Hussain | H04L 49/90 |
| | | | | 709/227 |
| 2006/0268913 | A1* | 11/2006 | Singh | H04L 49/90 |
| | | | | 370/412 |
| 2009/0019196 | A1* | 1/2009 | Chew | H04L 47/522 |
| | | | | 710/54 |
| 2011/0161626 | A1* | 6/2011 | Mangione-Smith | |
| | | | | H04L 47/823 |
| | | | | 712/29 |
| 2012/0033680 | A1 | 2/2012 | Gopinath et al. | |
| 2014/0325183 | A1* | 10/2014 | Rozen | G06F 15/76 |
| | | | | 712/30 |
| 2015/0188836 | A1 | 7/2015 | Liu et al. | |
| 2016/0026516 | A1 | 1/2016 | Gmuender et al. | |
| 2016/0127252 | A1 | 5/2016 | Tsirkin et al. | |

OTHER PUBLICATIONS

Written opinion for PCT application No. PCT/US2017/060586, dated Feb. 6, 2018 (8 pages).

* cited by examiner

TECHNOLOGIES FOR MULTI-CORE WIRELESS NETWORK DATA TRANSMISSION

BACKGROUND

Current computing devices may include wireless networking hardware. Typical computing systems include a networking stack to receive upper-layer network packets, manipulate the packets into network frames, and perform other networking operations. As wireless networking protocols operate at increased data rates, the required processing power also increases with overall throughput.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
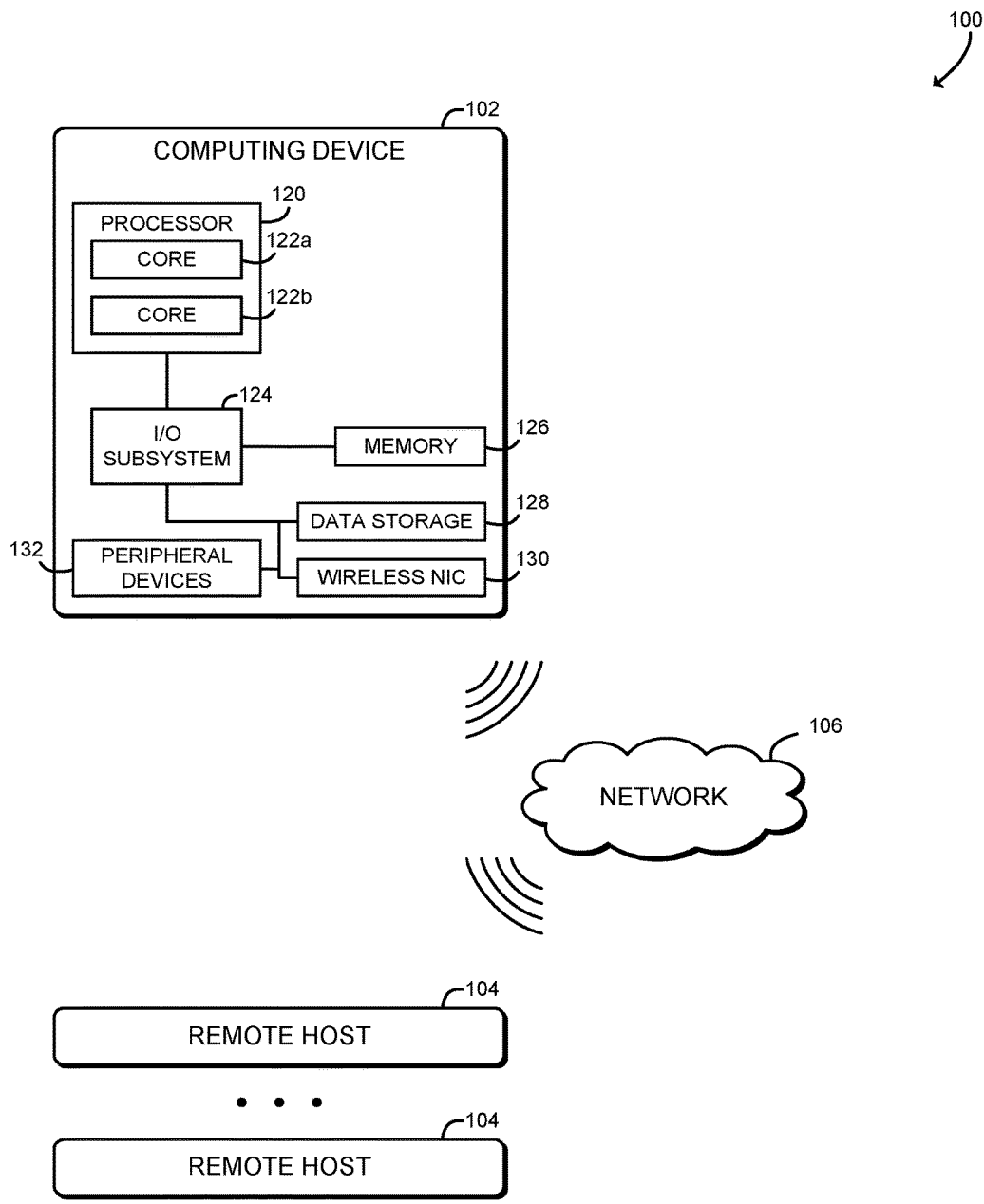
FIG. 1 is a simplified block diagram of at least one embodiment of a system for a multi-core wireless network data transmission.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In certain circumstances, wireless network transmissions may become processor-bound. Wireless drivers typically establish a single transmission queue and operate in a single-threaded fashion or require multiple processes to take software locks on the transmission queue. Thus, typical computing devices that include multi-core processors may become bound by the single-threaded performance of the processor. Balanced multicore processor utilization may be achieved for the receive path using receive side scaling (RSS).

Referring now to FIG. 1, in an illustrative embodiment, a system 100 for multicore wireless networking includes a computing device 102 in wireless communication with one or more remote hosts 104 over a network 106. The computing device 102 includes a multi-core processor and a wireless network interface controller (NIC). In use, as described further below, the computing device 102 allocates multiple transmission queues, one for each processor core. In response to receiving packet data from an application, a wireless driver executed by a processor core of the computing device 102 identifies the current processor core and enqueues the packet data in the corresponding transmission queue. The wireless NIC merges packet data from the multiple transmission queues into one hardware transmission queue, adds a hardware-managed sequence number, and transmits the packet data over the network 106. After transmitting a data packet, the wireless NIC sends an interrupt to the same processor core that originated the data packet to indicate whether the data packet was transmitted successfully. Accordingly, the computing device 102 may enable multithreaded or otherwise multicore transmission of data without requiring software locks or other synchronization techniques for a transmission queue. Thus, the computing device 102 may balance processor resource utilization among the processor cores, which may improve wireless data transmission rates, improve power consumption, or otherwise improve wireless networking performance as compared to single-threaded wireless data transmission.

The computing device 102 may be embodied as any type of computation or computer device capable of performing the functions described herein, including, without limitation, a computer, a laptop computer, a notebook computer, a tablet computer, a mobile computing device, a wearable computing device, a desktop computer, a workstation, a server, a network appliance, a web appliance, a distributed computing system, a processor-based system, and/or a consumer electronic device. As shown in FIG. 1, a computing device 102 illustratively includes a processor 120, an input/output subsystem 124, a memory 126, a data storage device 128, and a wireless network interface controller (NIC) 130. Of course, the computing device 102 may include other or additional components, such as those commonly found in a laptop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The illustrative processor 120 is a dual-core processor 120 having two processor cores 122, each of which is an independent processing unit capable of executing programmed instructions. It should be understood that in other embodiments the processor 120 may be embodied as a multi-core or multi-threaded processor, digital signal processor, microcontroller, or other processor or processing/controlling circuit with multiple processor cores or other independent processing units.

The memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices.

The wireless NIC 130 of the computing device 102 may be embodied as any communication circuit, device, or collection thereof, capable of enabling wireless communications between the computing device 102 and other remote devices over a network. The wireless NIC 130 may be configured to use any one or more communication technology and associated protocols (e.g., Wi-Fi®, Bluetooth®, WiMAX, etc.) to effect such communication.

As shown, the computing device 102 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Each remote host 104 may be embodied as any type of computation or computer device capable of performing the functions described herein, including, without limitation, a computer, a laptop computer, a notebook computer, a tablet computer, a mobile computing device, a wearable computing device, a desktop computer, a workstation, a server, a network appliance, a wireless access point, a web appliance, a distributed computing system, a processor-based system, and/or a consumer electronic device. Each remote host 104 may include a processor, an I/O subsystem, a memory, a data storage device, a wireless NIC, and/or other components and devices commonly found in a laptop computer or similar computing device. Those individual components of the remote host 104 may be similar to the corresponding components of the computing device 102, the description of which is applicable to the corresponding components of the remote host 104 and is not repeated herein so as not to obscure the present disclosure.

As discussed in more detail below, the computing device 102 and the remote host 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet or RF network. As such, the network 106 may include any number of additional devices, such as additional computers, routers, wireless access points, and switches, to facilitate communications among the devices of the system 100.

Figure 2:
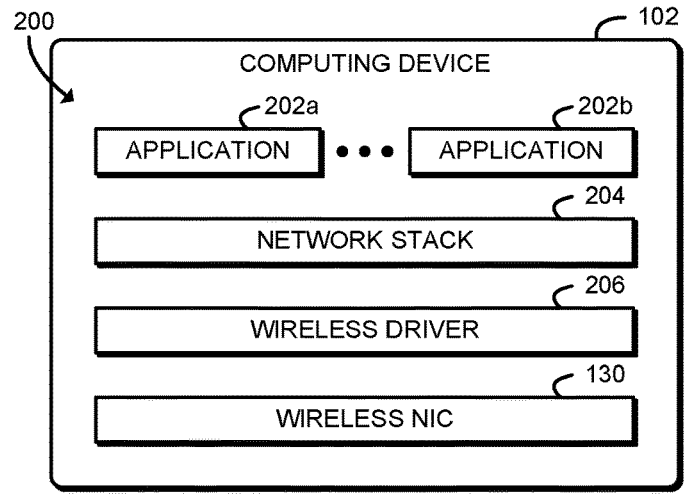
FIG. 2 is a simplified block diagram of at least one embodiment of an environment that may be established by the system of FIG. 1.

Referring now to FIG. 2, in an illustrative embodiment, the computing device 102 establishes an environment 200 during operation. The illustrative environment 200 includes one or more applications 202, a network stack 204, a wireless driver 206, and the wireless NIC 130. The various components of the environment 200 may be embodied as hardware, firmware, software, or a combination thereof. As such, in some embodiments, one or more of the components of the environment 200 may be embodied as circuitry or collection of electrical devices (e.g., application circuitry 202, network stack circuitry 204, and/or wireless driver circuitry 206). It should be appreciated that, in such embodiments, one or more of the application circuitry 202, the network stack circuitry 204, and/or the wireless driver circuitry 206 may form a portion of one or more of the processor 120, the I/O subsystem 124, and/or other components of the computing device 102. Additionally, in some embodiments, one or more of the illustrative components may form a portion of another component and/or one or more of the illustrative components may be independent of one another.

Each application 202 may be embodied as any computer program executed by the computing device 102, such as a process, a thread, managed code, or any other executable program. Each application 202 is executed by a particular processor core 122 in an execution context. The application 202 may transmit network data using the network stack 204, which may be embodied as an operating system networking framework and/or any supporting libraries, applications, or other networking services. For example, the network stack 204 may include a sockets interface, a TCP/IP stack, and other networking and I/O components of the computing device 102. The network stack 204 may prepare or otherwise process network data packets for transmission and may invoke the wireless driver 206 to transmit the data packets.

The wireless driver 206 is configured to allocate multiple transmission queues. Each transmission queue is associated with a processor core 122 of the processor 120, and may be further associated with a network peer and a traffic identifier (TID). The wireless driver 206 is further configured to receive packets for transmission from an application 202. As described above, the wireless driver 206 may receive the packets in response to being invoked in the execution context of the application 202. The wireless driver 206 is further configured to determine a current processor core 122 of the execution context, add metadata to the packet that is indicative of the current processor core 122, and then enqueue the packet in the transmission queue associated with the current processor core 122.

The wireless NIC 130 is configured to merge packet data from the transmission queues into a hardware transmission queue of the wireless NIC 130. The wireless NIC 130 is further configured to add a sequence number to the packet in response merging the packet data and then transmit the packet. The wireless NIC 130 is configured to increment the sequence number in response to adding the sequence number to the packet. The wireless NIC 130 may be further configured to determine the current processor core 122 based on the metadata of the packet in response transmitting the packet and then raise an interrupt that indicates whether the packet transmitted successfully to the current processor core 122.

Figure 3:
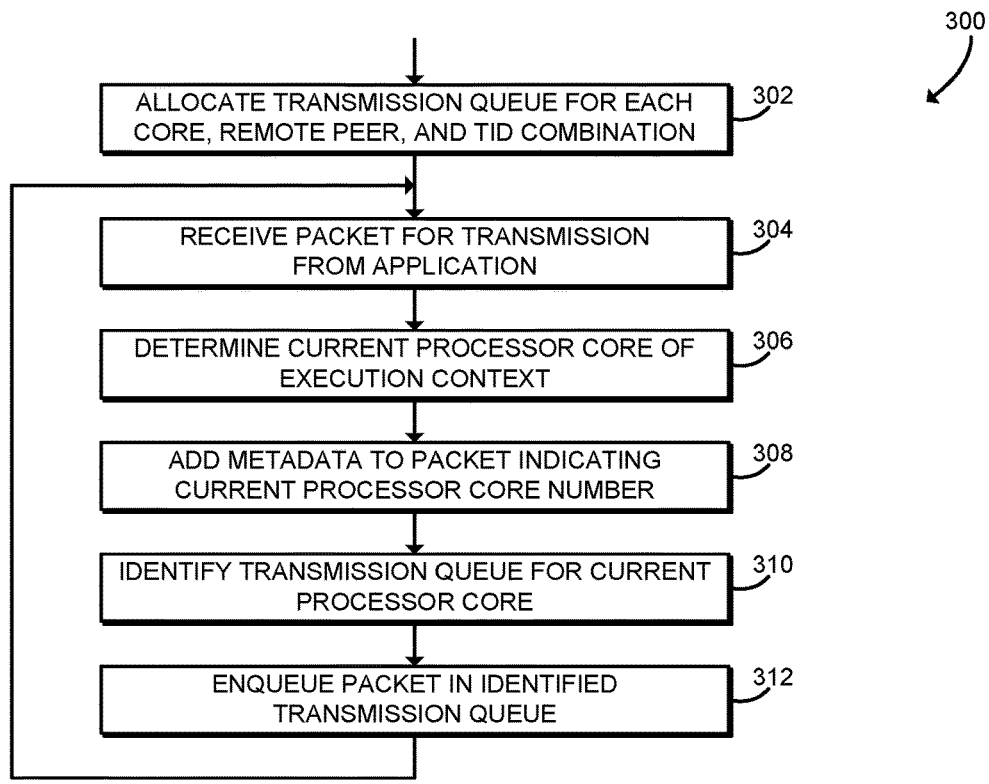
FIG. 3 is a simplified flow diagram of at least one embodiment of a method for wireless driver processing that may be executed by a computing device of FIGS. 1-2.

Referring now to FIG. 3, in use, a computing device 102 may execute a method 300 for wireless driver processing. It should be appreciated that, in some embodiments, the operations of the method 300 may be performed by one or more components of the environment 200 of the computing device 102 as shown in FIG. 2, such as the wireless driver 206. The method 300 begins in block 302, in which the wireless driver 206 of the computing device 102 allocates multiple transmission queues. In particular, the wireless driver 206 allocates a transmission queue for each processor core 122 of the computing device 102. The wireless driver 206 may allocate the transmission queues in response to an application 202 opening a network connection to a remote peer such as a remote host 104. Thus, the wireless driver 206 may allocate a transmission queue for each processor core 122 for each combination of remote peer (i.e. a MAC address or other layer 2 address) and quality-of-service level (e.g., traffic identifier TID). For example, in the illustrative embodiment, the computing device 102 includes two processor cores 122a, 122b, and thus the wireless driver 206 may allocate two transmission queues for each combination of remote peer and TID. In another embodiment with four processor cores 122, the wireless driver 206 may allocate four transmission queues for each combination of remote peer and TID, and so on. After allocating the transmission queues, the computing device 102 may execute one or more applications 202 that may access the network stack 204.

In block 304, the wireless driver 206 receives a data packet for transmission over the network 106 from an application 202. The application 202 may submit the data packet to the network stack 204, for example by sending data to a network socket or other high-level networking structure, and the networking stack 204 may invoke the wireless driver 206. The data packet may be embodied as a TCP segment, IP datagram, physical layer frame, or other network data packet. The wireless driver 206 is invoked in the execution context of the application 202. In other words, the wireless driver 206 receives the data packet while being executed by the same processor core 122 as the application 202. Thus, although illustrated as receiving the data packet from a single application 202, it should be understood that the wireless driver 206 may simultaneously receive data packets for transmission from multiple applications 202, each in a separate execution context. Additionally or alternatively, in some embodiments the wireless driver 206 may simultaneously receive data packets for transmission from the same application 202 in multiple, separate execution contexts (e.g., from multiple threads of a single process).

In block 306, the wireless driver 206 determines the current processor core 122 of the current execution context. The wireless driver 206 may, for example, determine the core number of the current processor core 122 (e.g., core number 0 or 1 in the illustrative embodiment). As described above, the current processor core 122 represents the processor core 122 that is currently executing the application 202 and that thus originated the data packet for transmission. In block 308, the wireless driver 206 adds metadata to the data packet that indicates the current processor core number. The wireless driver 206 may add the metadata to any field of the data packet that is provided to the wireless NIC 130, so that the metadata may be processed by the wireless NIC 130 as described below in connection with FIG. 4. For example, the wireless driver 206 may add the processor core number to the descriptor of the data packet or to another metadata field of the data packet.

In block 310, the wireless driver 206 identifies the transmission queue for the current processor core 122. For example, the wireless driver 206 may identify a transmission queue with an index matching the core number of the current processor core 122. In block 312, the wireless driver 206 enqueues the data packet in the identified transmission queue. Because the identified transmission queue is assigned to the current processor core 122, processes executed by other processor cores 122 will not access the transmission queue and thus the wireless driver 206 may add the data packet to the transmission queue without taking out a lock on the transmission queue or otherwise performing a synchronization operation. Data packets are thus included in the transmission queue in the same order that they are provided by the application 202 that invoked the wireless driver 206. After the data packet is enqueued in the transmission queue, the wireless NIC 130 transmits the data packet over the network 106 as described below in connection with FIG. 4. After enqueuing the data packet, the method 300 loops back to block 304, in which the wireless driver 206 may process additional data packets.

Figure 4:
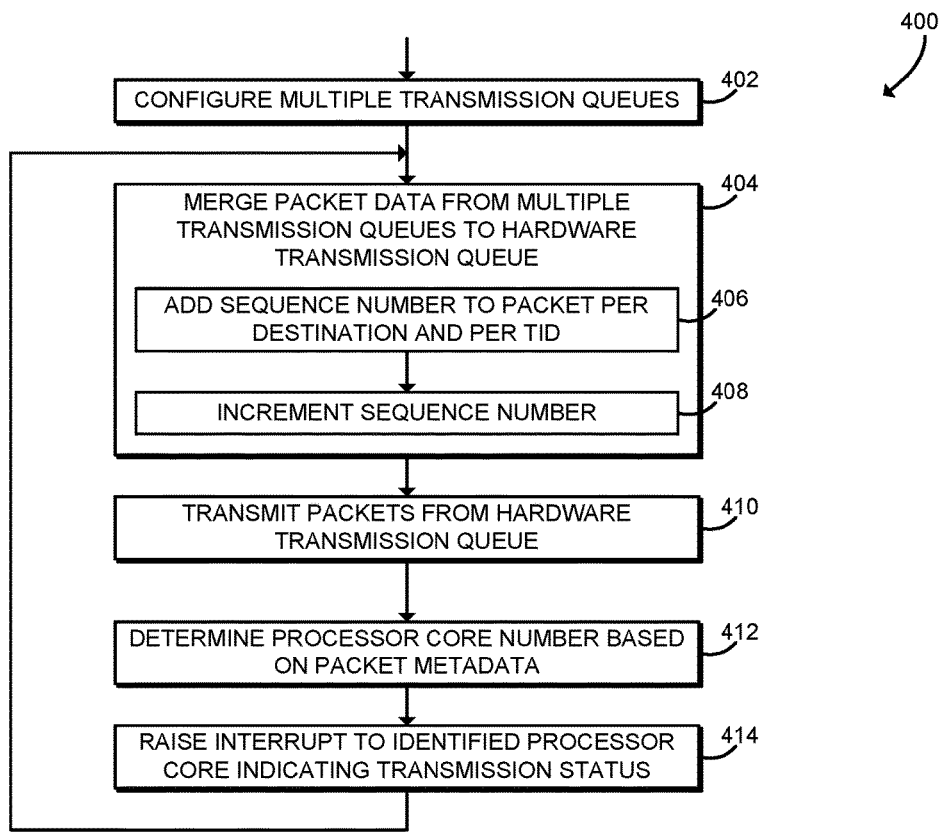
FIG. 4 is a simplified flow diagram of at least one embodiment of a method for wireless data transmission that may be executed by the computing device of FIGS. 1-2.

Referring now to FIG. 4, in use, a computing device 102 may execute a method 400 for wireless data transmission. It should be appreciated that, in some embodiments, the operations of the method 400 may be performed by one or more components of the environment 200 of the computing device 102 as shown in FIG. 2, such as the wireless NIC 130. The method 400 begins in block 402, in which the computing device 102 configures the wireless NIC 130 with multiple transmission queues. As described above in connection with FIG. 3, a transmission queue may be allocated for each combination of processor core 122, remote peer, and traffic identifier (TID) in use by the computing device 102. The wireless NIC 130 may be configured with the addresses of those transmission queues in the memory 126, for example by setting one or more configuration registers. After being configured, the wireless NIC 130 is capable of performing direct memory access (DMA) operations to access the contents of the transmission queues.

In block 404, the wireless NIC 130 merges packet data from multiple transmission queues into a merged hardware transmission queue. The wireless NIC 130 may perform DMA operations to copy the packet data from multiple transmission queues into a single hardware transmission queue. In block 406, the wireless NIC 130 adds a sequence number to each of the data packets added to the hardware transmission queue. The wireless NIC 130 maintains a separate sequence number for each combination of remote peer and traffic identifier (TID). In block 408, the wireless NIC 130 increments the sequence number after adding the data packet to the hardware transmission queue. Thus, the wireless NIC 130 maintains consistent sequence numbering for data packets transmitted to the same remote peer and TID combination, even when those data packets originate from different transmission queues and therefore from different processor cores 122.

In block 410, the wireless NIC 130 transmits the data packets from the merged hardware transmission queue to the remote peer. The wireless NIC 130 may, for example, copy data packets from the hardware transmission queue into a hardware transmission FIFO or other buffer, and then the wireless NIC 130 may transmit the data packets over the physical medium (e.g., using radio waves). The wireless NIC 130 determines whether the data packet transmitted successfully, for example by waiting to receive an acknowledgment frame from the remote peer or other indication of the status of the transmission.

In block 412, after determining whether the data packet was transmitted successfully or not, the wireless NIC 130 determines the processor core number of the processor core 122 that originated the data packet. The wireless NIC 130 determines the processor core number by reading metadata included by the wireless driver 206 in the data packet, as described above in connection with FIG. 3. In block 414, the wireless NIC 130 raises an interrupt directly to the processor core 122 that originated the data packet. For example, the wireless NIC 130 may raise the interrupt using message signaled interrupts (MSI-X) or other appropriate technology to signal an interrupt to a particular processor core 122 over a peripheral bus or other interconnect. The interrupt indicates whether the data packet was successfully transmitted. In response to the interrupt, the wireless driver 206 may release the data packets from the appropriate transmission queue or otherwise process the indication. Processing the indication by the same processor core 122 may improve performance, for example by increasing the probability that the data packet or other data is already in cache and by balancing processor utilization between processor cores 122. After raising the interrupt, the method 400 loops back to block 404, in which the wireless NIC 130 may transmit additional data packets.

Figure 5:
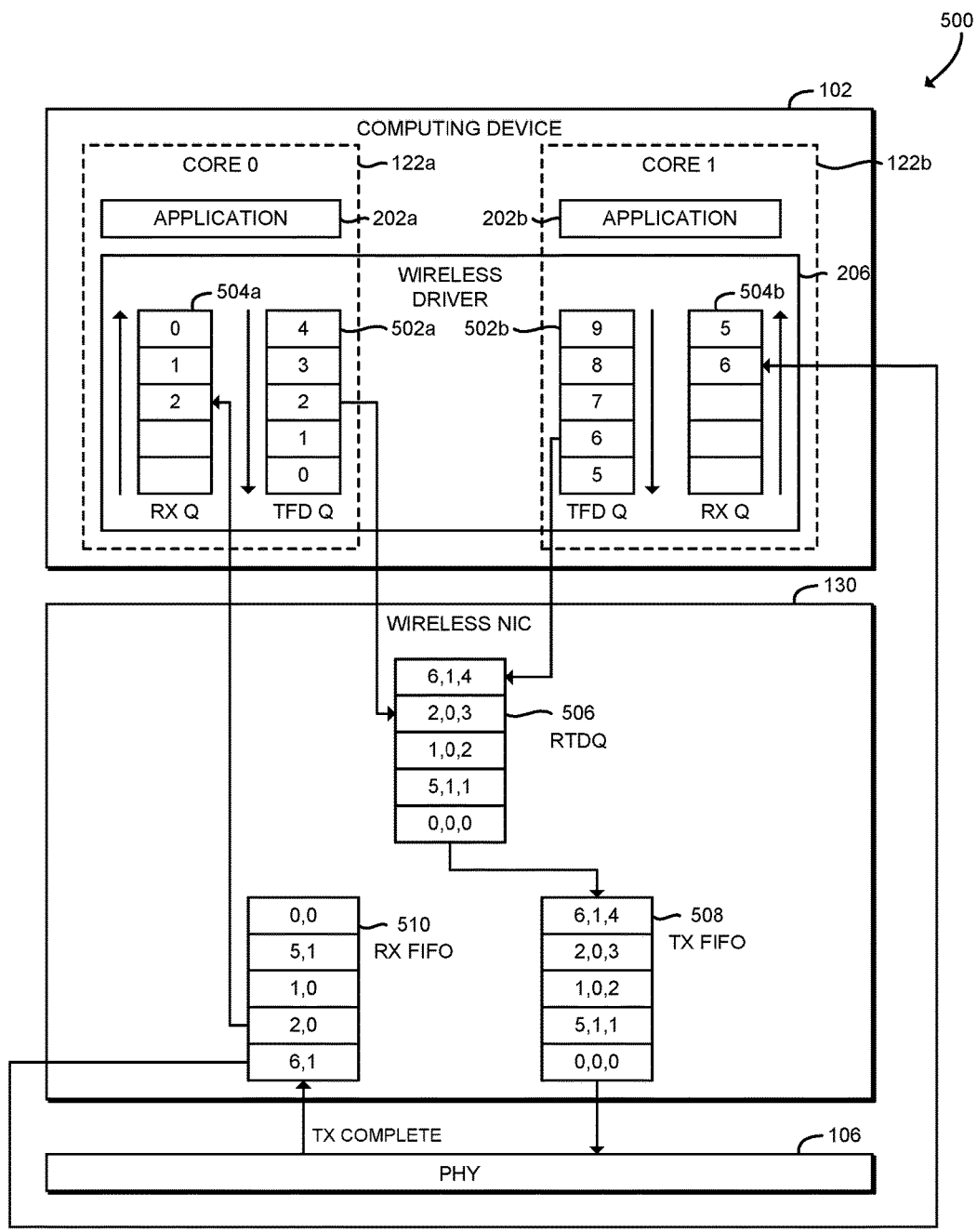
FIG. 5 is a schematic diagram of at least one embodiment of a wireless data transmission process that may be executed by the computing device of FIGS. 1-2.

Referring now to FIG. 5, schematic diagram 500 illustrates one potential embodiment of the wireless data transmission process described above. As shown, the computing device 102 is coupled to the wireless NIC 130, which is coupled to the physical layer of the network 106. The illustrative computing device 102 includes two processor cores 122a, 122b and executes two applications 202a, 202b and a wireless driver 206. The wireless driver 206 allocates two transmission queues 502a, 502b, labeled as TFD queues. As shown, the transmission queue 502a is assigned to the processor core 122a, and the transmission queue 502b is assigned to the processor core 122b. Similarly, the wireless driver 206 allocates two receive queues 504a, 504b, labeled as RX queues. The wireless NIC 130 includes a merged hardware transmission queue 506, labeled as RTDQ. The wireless NIC 130 also includes a transmission FIFO 508 and a receive FIFO 510.

In use, each application 202a, 202b submits data packets to the wireless driver 206. The wireless driver 206 enqueues data packets from the application 202a into the transmission queue 502a and enqueues data packets from the application 202b into the transmission queue 502b. Each transmission queue 502a, 502b may include a packet number provide by the corresponding application 202a, 202b, such as a TCP sequence number. Illustratively, the application 202a transmits packets with packet numbers zero to four, and the application 202b transmits packets with packet numbers five to nine.

As shown, the wireless NIC 130 merges data packets from the transmission queues 502a, 502b into the hardware transmission queue 506. As described above, the data packet may include metadata indicating the processor core 122 that enqueued the data packet, and the wireless NIC 130 adds a sequence number to the data packet, such as a Wi-Fi sequence number. The diagram 500 illustrates entries in the hardware transmission queue 506 with three numbers that correspond to the packet number (i.e., TCP sequence number), the processor core number, and the sequence number added by the wireless NIC 130 (i.e., Wi-Fi sequence number). As shown, the hardware transmission queue 506 includes five entries: (1) packet 0 from core 0 with Wi-Fi sequence number 0; (2) packet 5 from core 1 with Wi-Fi sequence number 1; (3) packet 1 from core 0 with Wi-Fi sequence number 2; (4) packet 2 from core 0 with Wi-Fi sequence number 3; and (5) packet 6 from core 1 with Wi-Fi sequence number 4.

The wireless NIC 130 moves the packets from the hardware transmission queue 506 to the transmission FIFO 508 for transmission. After transmission, the wireless NIC 130 receives an indication of whether transmission was successful from the physical layer of the network 106. As shown, the indications are stored in the receive FIFO 510 and include the packet number and the processor core number. The wireless NIC 130 examines the processor core number and generates an interrupt to the associated processor core 122 to process the indication. For example, as shown, packet 6 triggers an interrupt to core number 1, i.e., processor core 122b, and packet 2 triggers an interrupt to core number 0, i.e., processor core 122a. In response to the interrupt, the processor core 122a, 122b may store the indication in the receive queue 504a, 504, respectively, or otherwise process the indication.

It should be appreciated that, in some embodiments, the methods 300 and/or 400 may be embodied as various instructions stored on a computer-readable media, which may be executed by the processor 120, the I/O subsystem 124, the wireless NIC 130, and/or other components of a computing device 102 to cause the computing device 102 to perform the respective method 300 and/or 400. The computer-readable media may be embodied as any type of media capable of being read by the computing device 102 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for wireless data transmission, the computing device comprising: a processor that includes a plurality of processor cores; and a wireless driver to: allocate a plurality of transmission queues, wherein each transmission queue is associated with a processor core of the plurality of processor cores; receive a packet for transmission from an application, wherein the wireless driver is invoked in an execution context of the application; determine a current processor core of the execution context of the wireless driver in response to receipt of the packet; add metadata to the packet indicative of the current processor core; and enqueue the packet in a first transmission queue in response to adding of the metadata to the packet, wherein the first transmission queue is associated with the current processor core.

Example 2 includes the subject matter of Example 1, and wherein each transmission queue of the plurality of transmission queues is further associated with a network peer and a traffic identifier.

Example 3 includes the subject matter of any of Examples 1 and 2, and further comprising a wireless network controller to: merge the packet from the first transmission queue with packet data from other transmission queues of the plurality of transmission queues into a hardware transmission queue of the wireless network controller in response to enqueuing of the packet; add a sequence number to the packet in response to merging of the packet; and transmit the packet in response to adding of the sequence number.

Example 4 includes the subject matter of any of Examples 1-3, and wherein: to merge the packet comprises to copy the packet from the first transmission queue into the hardware transmission queue; and to add the sequence number comprises to write the sequence number to the packet in the hardware transmission queue in response to copying of the packet from the first transmission queue.

Example 5 includes the subject matter of any of Examples 1-4, and wherein the wireless network controller is further to: determine the current processor core based on the metadata of the packet in response to transmission of the packet; and raise an interrupt to the current processor core in response to a determination of the current processor core, wherein the interrupt is indicative of whether the packet transmitted successfully.

Example 6 includes the subject matter of any of Examples 1-5, and wherein the wireless network controller is further to increment the sequence number in response to the adding of the sequence number to the packet.

Example 7 includes the subject matter of any of Examples 1-6, and wherein incrementing the sequence number comprises incrementing the sequence number based on a remote peer and a traffic identifier of the packet.

Example 8 includes the subject matter of any of Examples 1-7, and wherein the sequence number comprises a wireless media access control (MAC) layer sequence number.

Example 9 includes the subject matter of any of Examples 1-8, and wherein the metadata indicative of the current processor core is included in a descriptor of the packet.

Example 10 includes the subject matter of any of Examples 1-9, and wherein: to determine the current processor core comprises to identify a processor core number of the current processor core; and the metadata comprises the processor core number.

Example 11 includes the subject matter of any of Examples 1-10, and further comprising an application to (i) execute in the execution context, wherein the execution context is indicative of the current processor core, and (ii) invoke the wireless driver in the execution context of the application.

Example 12 includes the subject matter of any of Examples 1-11, and wherein to invoke the wireless driver comprises to invoke the wireless driver via a network stack of the computing device.

Example 13 includes a method for wireless data transmission, the method comprising: allocating, by a wireless driver of a computing device, a plurality of transmission queues, wherein each transmission queue is associated with a processor core of the computing device; receiving, by the wireless driver, a packet for transmission from an application, wherein the wireless driver is invoked in an execution context of the application; determining, by the wireless driver, a current processor core of the execution context of the wireless driver in response to receiving the packet; adding, by the wireless driver, metadata to the packet indicative of the current processor core; and enqueuing, by the wireless driver, the packet in a first transmission queue in response to adding the metadata to the packet, wherein the first transmission queue is associated with the current processor core.

Example 14 includes the subject matter of Example 13, and wherein each transmission queue of the plurality of transmission queues is further associated with a network peer and a traffic identifier.

Example 15 includes the subject matter of any of Examples 13 and 14, and further comprising: merging, by a wireless network controller, the packet from the first transmission queue with packet data from other transmission queues of the plurality of transmission queues into a hardware transmission queue of the wireless network controller in response to enqueuing the packet; adding, by the network controller, a sequence number to the packet in response to merging the packet; and transmitting, by the wireless network controller, the packet in response to adding the sequence number.

Example 16 includes the subject matter of any of Examples 13-15, and wherein: merging the packet comprises copying the packet from the first transmission queue into the hardware transmission queue; and adding the sequence number comprises writing the sequence number to the packet in the hardware transmission queue in response to copying the packet from the first transmission queue.

Example 17 includes the subject matter of any of Examples 13-16, and further comprising: determining, by the wireless network controller, the current processor core based on the metadata of the packet in response to transmitting the packet; and raising, by the wireless network controller, an interrupt to the current processor core in response to determining the current processor core, wherein the interrupt is indicative of whether the packet transmitted successfully.

Example 18 includes the subject matter of any of Examples 13-17, and further comprising incrementing, by the wireless network controller, the sequence number in response to adding the sequence number to the packet.

Example 19 includes the subject matter of any of Examples 13-18, and wherein incrementing the sequence number comprises incrementing the sequence number based on a remote peer and a traffic identifier of the packet.

Example 20 includes the subject matter of any of Examples 13-19, and wherein adding the sequence number comprises adding a wireless media access control (MAC) layer sequence number.

Example 21 includes the subject matter of any of Examples 13-20, and wherein the metadata indicative of the current processor core is included in a descriptor of the packet.

Example 22 includes the subject matter of any of Examples 13-21, and wherein: determining the current processor core comprises identifying a processor core number of the current processor core; and adding the metadata to the packet comprises adding the processor core number.

Example 23 includes the subject matter of any of Examples 13-22, and further comprising: executing, by the computing device, the application in the execution context, wherein the execution context is indicative of the current processor core; and invoking, by the application, the wireless driver in the execution context of the application.

Example 24 includes the subject matter of any of Examples 13-23, and wherein invoking the wireless driver comprises invoking the wireless driver via a network stack of the computing device.

Example 25 includes a computing device comprising: a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for wireless data transmission, the computing device comprising: means for allocating, by a wireless driver of a computing device, a plurality of transmission queues, wherein each transmission queue is associated with a processor core of the computing device; means for receiving, by the wireless driver, a packet for transmission from an application, wherein the wireless driver is invoked in an execution context of the application; means for determining, by the wireless driver, a current processor core of the execution context of the wireless driver in response to receiving the packet; means for adding, by the wireless driver, metadata to the packet indicative of the current processor core; and means for enqueuing, by the wireless driver, the packet in a first transmission queue in response to adding the metadata to the packet, wherein the first transmission queue is associated with the current processor core.

Example 29 includes the subject matter of Example 28, and wherein each transmission queue of the plurality of transmission queues is further associated with a network peer and a traffic identifier.

Example 30 includes the subject matter of any of Examples 28 and 29, and further comprising: means for merging, by a wireless network controller, the packet from the first transmission queue with packet data from other transmission queues of the plurality of transmission queues into a hardware transmission queue of the wireless network controller in response to enqueuing the packet; means for adding, by the wireless network controller, a sequence number to the packet in response to merging the packet; and means for transmitting, by the wireless network controller, the packet in response to adding the sequence number.

Example 31 includes the subject matter of any of Examples 28-30, and wherein: the means for merging the packet comprises means for copying the packet from the first transmission queue into the hardware transmission queue; and the means for adding the sequence number comprises means for writing the sequence number to the packet in the hardware transmission queue in response to copying the packet from the first transmission queue.

Example 32 includes the subject matter of any of Examples 28-31, and further comprising: means for determining, by the wireless network controller, the current processor core based on the metadata of the packet in response to transmitting the packet; and means for raising, by the wireless network controller, an interrupt to the current processor core in response to determining the current processor core, wherein the interrupt is indicative of whether the packet transmitted successfully.

Example 33 includes the subject matter of any of Examples 28-32, and further comprising means for incrementing, by the wireless network controller, the sequence number in response to adding the sequence number to the packet.

Example 34 includes the subject matter of any of Examples 28-33, and wherein the means for incrementing the sequence number comprises means for incrementing the sequence number based on a remote peer and a traffic identifier of the packet.

Example 35 includes the subject matter of any of Examples 28-34, and wherein the means for adding the sequence number comprises means for adding a wireless media access control (MAC) layer sequence number.

Example 36 includes the subject matter of any of Examples 28-35, and wherein the metadata indicative of the current processor core is included in a descriptor of the packet.

Example 37 includes the subject matter of any of Examples 28-36, and wherein: the means for determining the current processor core comprises means for identifying a processor core number of the current processor core; and the means for adding the metadata to the packet comprises means for adding the processor core number.

Example 38 includes the subject matter of any of Examples 28-37, and further comprising: means for executing the application in the execution context, wherein the execution context is indicative of the current processor core; and means for invoking, by the application, the wireless driver in the execution context of the application.

Example 39 includes the subject matter of any of Examples 28-38, and wherein the means for invoking the wireless driver comprises means for invoking the wireless driver via a network stack of the computing device.

The invention claimed is:

1. A computing device for wireless data transmission, the computing device comprising:
   a processor that includes a plurality of processor cores; and
   a wireless driver to:
      allocate a plurality of transmission queues, wherein each transmission queue is associated with one processor core of the plurality of processor cores;
      receive, by a current processor core of the plurality of processor cores, a packet for transmission from an application, wherein the wireless driver is invoked in an execution context of the application, wherein the current processor core is associated with the execution context;
      determine, by the current processor core, the current processor core of the execution context of the wireless driver in response to receipt of the packet;
      add, by the current processor core, metadata to the packet indicative of the current processor core, wherein the current processor core comprises the originating core of the packet; and enqueue, by the current processor core, the packet in a first transmission queue in response to adding of the metadata to the packet, wherein the first transmission queue is associated with the current processor core.

2. The computing device of claim 1, wherein each transmission queue of the plurality of transmission queues is further associated with a network peer and a traffic identifier.

3. The computing device of claim 1, further comprising a wireless network controller to:

merge the packet from the first transmission queue with packet data from other transmission queues of the plurality of transmission queues into a hardware transmission queue of the wireless network controller in response to enqueuing of the packet;

add a sequence number to the packet in response to merging of the packet; and transmit the packet in response to adding of the sequence number.

4. The computing device of claim 3, wherein:

to merge the packet comprises to copy the packet from the first transmission queue into the hardware transmission queue; and to add the sequence number comprises to write the sequence number to the packet in the hardware transmission queue in response to copying of the packet from the first transmission queue.

5. The computing device of claim 3, wherein the wireless network controller is further to:

determine the current processor core based on the metadata of the packet in response to transmission of the packet; and raise an interrupt to the current processor core in response to a determination of the current processor core, wherein the interrupt is indicative of whether the packet transmitted successfully.

6. The computing device of claim 3, wherein the wireless network controller is further to increment the sequence number in response to the adding of the sequence number to the packet.

7. The computing device of claim 3, wherein the sequence number comprises a wireless media access control (MAC) layer sequence number.

8. The computing device of claim 1, wherein the metadata indicative of the current processor core is included in a descriptor of the packet.

9. The computing device of claim 1, wherein:

to determine the current processor core comprises to identify a processor core number of the current processor core; and the metadata comprises the processor core number.

10. The computing device of claim 1, further comprising an application to (i) execute in the execution context, wherein the execution context is indicative of the current processor core, and (ii) invoke the wireless driver in the execution context of the application.

11. The computing device of claim 10, wherein to invoke the wireless driver comprises to invoke the wireless driver via a network stack of the computing device.

12. A method for wireless data transmission, the method comprising:

allocating, by a wireless driver of a computing device, a plurality of transmission queues, wherein each transmission queue is associated with one processor core of a plurality of processor cores of the computing device;

receiving, by the wireless driver executed by a current processor core of the plurality of processor cores, a packet for transmission from an application, wherein the wireless driver is invoked in an execution context of the application, wherein the current processor core is associated with the execution context;

determining, by the wireless driver executed by the current processor core, the current processor core of the execution context of the wireless driver in response to receiving the packet;

adding, by the wireless driver executed by the current processor core, metadata to the packet indicative of the current processor core, wherein the current processor core comprises the originating core of the packet; and enqueuing, by the wireless driver executed by the current processor core, the packet in a first transmission queue in response to adding the metadata to the packet, wherein the first transmission queue is associated with the current processor core.

13. The method of claim 12, further comprising:

merging, by a wireless network controller, the packet from the first transmission queue with packet data from other transmission queues of the plurality of transmission queues into a hardware transmission queue of the wireless network controller in response to enqueuing the packet;

adding, by the wireless network controller, a sequence number to the packet in response to merging the packet; and transmitting, by the wireless network controller, the packet in response to adding the sequence number.

14. The method of claim 13, wherein:

merging the packet comprises copying the packet from the first transmission queue into the hardware transmission queue; and adding the sequence number comprises writing the sequence number to the packet in the hardware transmission queue in response to copying the packet from the first transmission queue.

15. The method of claim 13, further comprising:

determining, by the wireless network controller, the current processor core based on the metadata of the packet in response to transmitting the packet; and raising, by the wireless network controller, an interrupt to the current processor core in response to determining the current processor core, wherein the interrupt is indicative of whether the packet transmitted successfully.

16. The method of claim 13, further comprising incrementing, by the wireless network controller, the sequence number in response to adding the sequence number to the packet.

17. The method of claim 12, wherein the metadata indicative of the current processor core is included in a descriptor of the packet.

18. The method of claim 12, wherein:

determining the current processor core comprises identifying a processor core number of the current processor core; and adding the metadata to the packet comprises adding the processor core number.

19. One or more non-transitory, computer-readable storage media comprising a plurality of instructions that in response to being executed cause a computing device to:

allocate, by a wireless driver of the computing device, a plurality of transmission queues, wherein each transmission queue is associated with one processor core of the computing device;

receive, by the wireless driver executed by a current processor core of the plurality of processor cores, a packet for transmission from an application, wherein the wireless driver is invoked in an execution context of the application, wherein the current processor core is associated with the execution context;

determine, by the wireless driver executed by the current processor core, the current processor core of the execution context of the wireless driver in response to receiving the packet;

add, by the wireless driver executed by the current processor core, metadata to the packet indicative of the current processor core, wherein the current processor core comprises the originating core of the packet; and enqueue, by the wireless driver executed by the current processor core, the packet in a first transmission queue in response to adding the metadata to the packet, wherein the first transmission queue is associated with the current processor core.

20. The one or more non-transitory, computer-readable storage media of claim 19, further comprising a plurality of instructions that in response to being executed cause the computing device to:

merge, by a wireless network controller, the packet from the first transmission queue with packet data from other transmission queues of the plurality of transmission queues into a hardware transmission queue of the wireless network controller in response to enqueuing the packet;

add, by the wireless network controller, a sequence number to the packet in response to merging the packet; and transmit, by the wireless network controller, the packet in response to adding the sequence number.

21. The one or more non-transitory, computer-readable storage media of claim 20, wherein:

to merge the packet comprises to copy the packet from the first transmission queue into the hardware transmission queue; and to add the sequence number comprises to write the sequence number to the packet in the hardware transmission queue in response to copying the packet from the first transmission queue.

22. The one or more non-transitory, computer-readable storage media of claim 20, further comprising a plurality of instructions that in response to being executed cause the computing device to:

determine, by the wireless network controller, the current processor core based on the metadata of the packet in response to transmitting the packet; and raise, by the wireless network controller, an interrupt to the current processor core in response to determining the current processor core, wherein the interrupt is indicative of whether the packet transmitted successfully.

23. The one or more non-transitory, computer-readable storage media of claim 20, further comprising a plurality of instructions that in response to being executed cause the computing device to increment, by the wireless network controller, the sequence number in response to adding the sequence number to the packet.

24. The one or more non-transitory, computer-readable storage media of claim 19, wherein the metadata indicative of the current processor core is included in a descriptor of the packet.

25. The one or more non-transitory, computer-readable storage media of claim 19, wherein:

to determine the current processor core comprises to identify a processor core number of the current processor core; and to add the metadata to the packet comprises to add the processor core number.

* * * * *